July 10, 1951     G. R. JORSCH     2,560,174

ROTARY CUTTER HEAD WITH MULTIPLE BLADE CLAMPING DISK

Filed June 25, 1948     2 Sheets-Sheet 1

INVENTOR.
GEORGE R. JORSCH,
BY
McMorrow, Berman + Davidson
ATTORNEYS.

July 10, 1951   G. R. JORSCH   2,560,174
ROTARY CUTTER HEAD WITH MULTIPLE BLADE CLAMPING DISK
Filed June 25, 1948   2 Sheets-Sheet 2
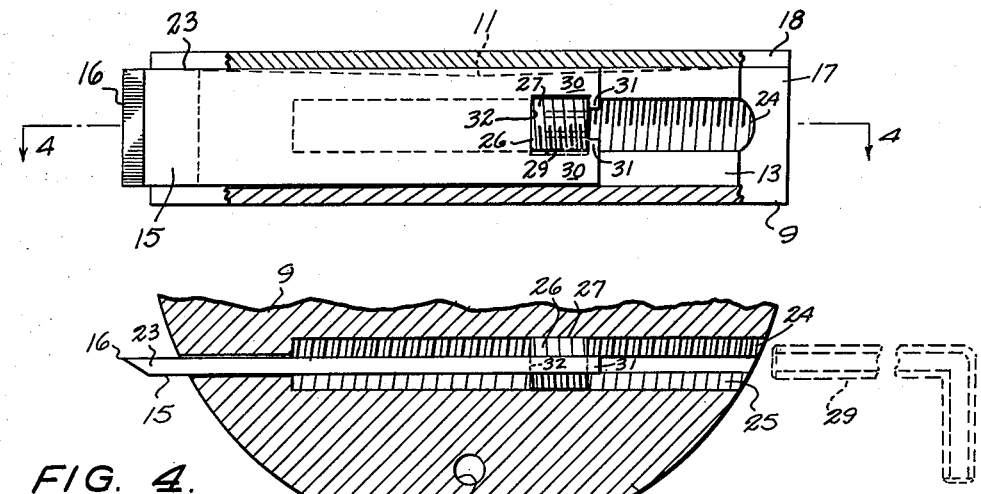
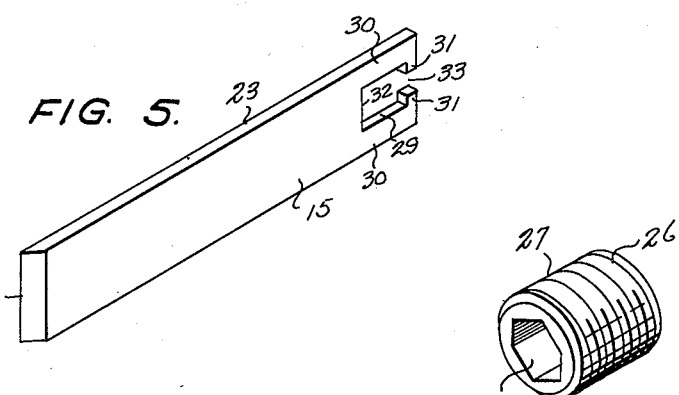
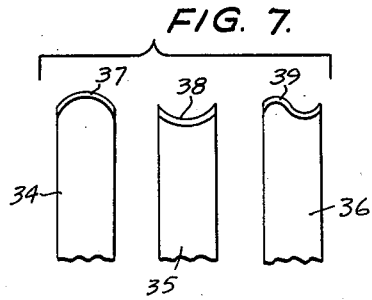
INVENTOR.
GEORGE R. JORSCH,
BY
McMorrow, Berman + Davidson
ATTORNEYS.

Patented July 10, 1951

2,560,174

UNITED STATES PATENT OFFICE 2,560,174

ROTARY CUTTERHEAD WITH MULTIPLE BLADE CLAMPING DISK

George R. Jorsch, Rhinelander, Wis.

Application June 25, 1948, Serial No. 35,074

1 Claim. (Cl. 144—231)

This invention relates to rotary cutter heads for making moldings, and particularly to a cutter head adapted to receive a plurality of cutter blades or tools with special means for adjusting the latter in position.

The main object of my invention is to provide a rotary cutter head of the indicated character with adjustable cutters of special construction cooperating with corresponding set screws fitting into screw passages within the cutter head.

Another object is to have such a cutter head wherein slots are provided for locating the cutters or tools therein and the set screw passages for the set screws are substantially aligned and longitudinally coaxial with the mentioned slots in such fashion that the set screws are capable of moving in these passages to adjust the cutters.

A further object is to have this type of cutter head in which the set screws are concealed and the cutters have detents cooperating therewith to cause adjustment in either direction of the cutters upon rotation of the set screws.

It is also an object of the invention to provide a cutter head which in addition firmly grips the cutters in adjusted positions when mounted on a saw arbor or shaft in position for operation.

Other objects and advantages of my invention will appear in further detail as the specification proceeds.

In order to facilitate ready comprehension of the invention and its salient features, said invention is illustrated on the accompanying drawings forming part hereof, and in which:

Figure 3 is a section taken on the line 3—3 in Figure 1;

Figure 4 is a section taken on line 4—4 in Figure 3;

Figure 5 is a perspective view of a cutter or tool embodying certain features of the invention;

Figure 6 is a perspective view of a set screw serving to cooperate with the cutter or tool of Figure 5 in the previously-mentioned cutter head;

Figure 7 illustrates how the cutters may be sharpened to have different profiles upon their cutting edges.

Throughout the views the same reference numerals indicate the same or like parts.

Figure 1:
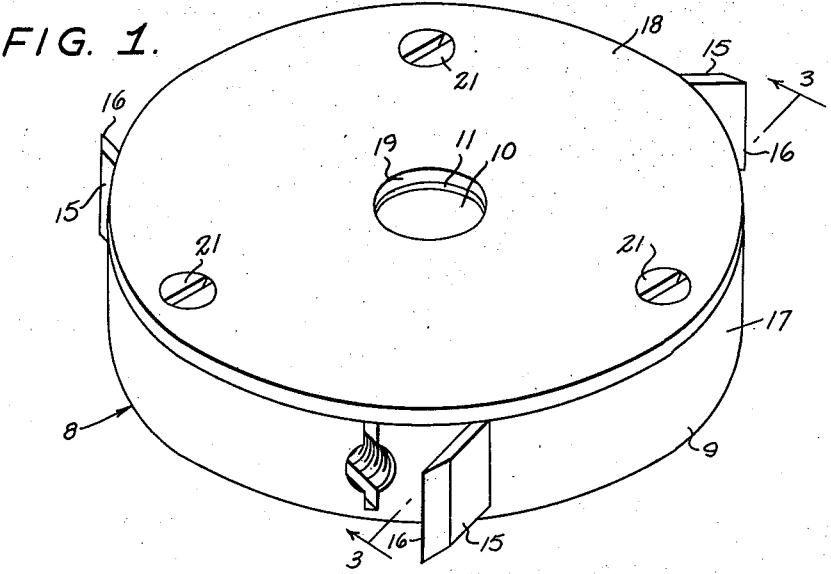
Figure 1 is a perspective view of a rotary cutter head made according to the invention and embodying the same in a practical form.
Figure 2:
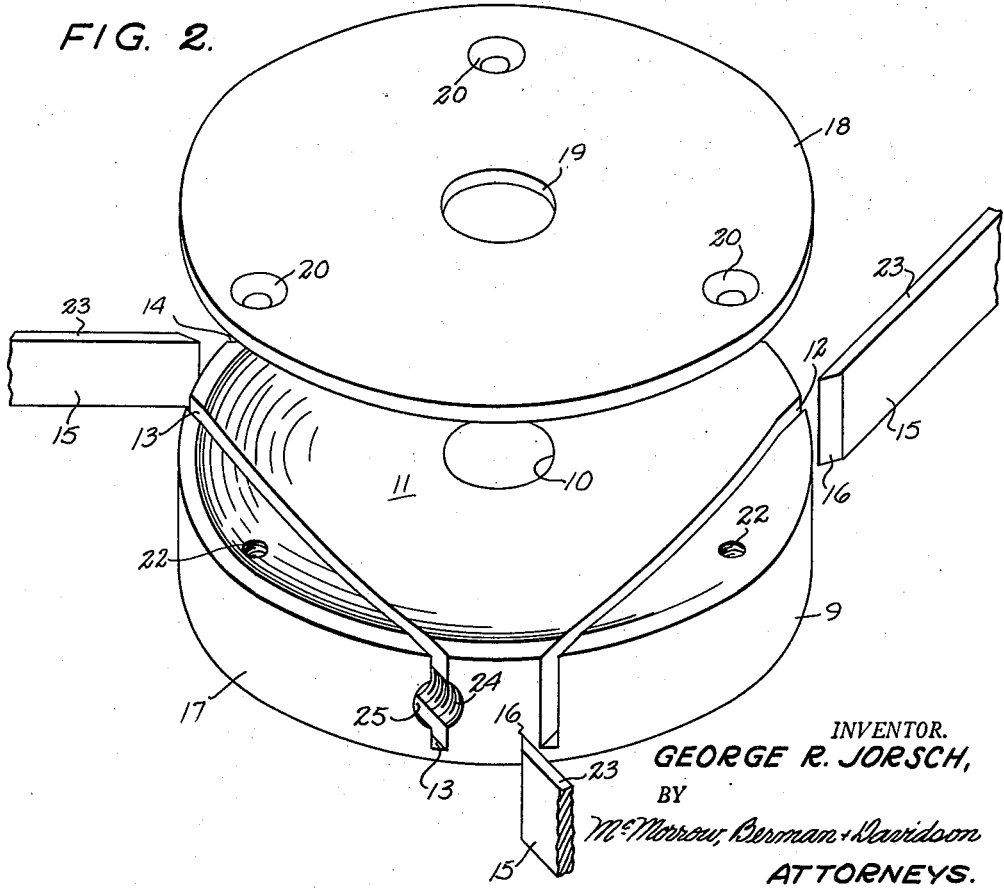
Figure 2 is an exploded perspective view of the same cutter head.

In making moldings it is usual to use rotary cutters, cutter heads and various devices rotating at high speed against the strips of wood used as stock for making the moldings, and upon these cutter heads the cutter tools have usually been gripped between tool members held together by bolts or screws so that the cutters have virtually been clamped by their side edges between the clamping members thus arranged to form the cutter head. However, one difficulty always present in such cutters is that accurate adjustment of the cutting tools has been a troublesome feature which has necessitated loosening the screws or bolts holding them and then striking the cutters slightly with a hammer or other tool in order to adjust the same outward, and then the screws have been tightened, after which the cutter has been rotated and a piece of wood has been run against it to test the depth of cut and the form as well, and in this fashion the trial-and-error method has been followed until the proper depth and form of cut has been attained before operation could begin.

Upon consideration of this problem, it was found necessary to depart from the usual principles of adjustment for the cutter blades on a cutter head and instead introduce new features, as will now be particularly described in detail.

Hence, in the practice of my invention, and referring again to the accompanying drawings, the cutter head, generally indicated at 8, primarily consists of a cylindrical solid body or heavy metal disc 9 having a central hole 10 adapting it to fit upon a saw arbor, while the upper surface 11 of the disc is slightly dished so that it is deeper at the intermediate central area than at the edges, for a purpose which will presently be explained. In the mentioned disc 9, which forms the body of the cutter head, are cut a plurality of chordal open ended slots 12, 13 and 14, and spaced from each other, each of the slots extending inwardly from the dished or upper surface 11 of the body 9 and terminating at a point adjacent to and spaced from the lower or other surface thereof. Positioned in each of the slots is a cutter 15 so disposed therein that the cutting edge 16 on one end thereof projects from one of the open ends of the slot and beyond the peripheral surface 17 of the body 9.

In order to properly hold the cutters in position in the slots 12, 13 and 14, a clamping assembly plate or disc 18 is provided with a central hole 19 coinciding with the previously-mentioned hole 10 and with a plurality of countersunk holes 20, 20, 20 for receiving the screws 21, 21, etc., when screwed down into the threaded holes 22, 22 in the main disc 9. When the assembled cutter head, as shown in Figure 1, is mounted on the arbor of a circular saw with the arbor projecting through the holes 10 and 19 of both discs 9 and 18 and the usual adjusting nut screwed up tight on the arbor, the disc 18 will, of course, be brought against the dished surface 11 of the heavier disc 9 which forms the main part of the cutter head and thereby also bringing the plate 18 in the intermediate portion thereof directly against the upper edges 23 of the tools 15 and thereby preventing any shifting of these tools sidewise in the slots, and by friction, also, tending to hold the tools altogether stationary within the cutter head.

However, in order to adjust the tools, each of slots 12, 13 and 14 has coaxially located with respect thereto the two halves 24, 25 of an internal feed screw thread which extends the major portion of the length of the slot in each case.

In each pair of feed screw portions 24 and 25 is located a set screw 26 having an external thread 27 operably fitting the threaded portions 24 and 25 already mentioned and having a wrench-receiving hexagonal, square or other type of engagement hole 28 in one end thereof for use with a special hexagonal wrench 29, the end thereof fitting the hole or socket 28 in such fashion as to allow turning of the set screw 26 by means of this wrench. In order to cooperate with the mentioned set screw, the rear end of each of the cutter blades or tools 15 is formed with a cut-out portion 29 resulting in a pair of substantially parallel and equal tail portions 30 which in turn have a pair of mutually-facing detents 31, 31. The arrangement is such that each cutting blade 15 has a set screw 26 located in the cut-out portion 29 at the rear thereof, this set screw engaging against the forward face 32 of this cut-out portion on the one hand and rearwardly against two detents 31, 31 on the other hand. The space 33 between the detents is so calculated as to provide a sufficient opening to allow entry of wrench 29 therebetween in order to enter socket 28 in the set screw for rotating the latter with the result that it begins to travel through the threaded portions 24 and 25 and, due to the presence of the forward face 32 and rear detents 31, 31, preventing the escape of the set screw from association with tools 15. The latter follows the set screw in its movement forwardly or rearwardly according to the direction in which it is rotated with respect to the mentioned feed screw portions. Of course, such adjustment is undertaken only when the upper disc 18 is released from clamped condition against the upper dished face 11 of the main disc 9 of the cutter head so that the tools will be sufficiently free to move. When the adjustment has been made to the desired extent, the disc may be tightened by tightening the nut upon the saw arbor (not shown), and the entire assembly will be rigid and ready for operation.

It is self-evident that the tools need not be formed or sharpened in the same fashion, but each tool may have a different profile and only one or two tools may be used, or all three, as desired, but if these tools are sharpened to have different cutter profiles, as for example shown in Figure 7 where the tools 34, 35, 36 have individual profiles 37, 38, 39, these may be used individually or together in such fashion that each cutter or tool contributes only a portion of the resulting profile to the molding being cut. This principle is well known in the wood-working art and need, therefore, not be enlarged upon here.

From the foregoing, it is evident that the cutter tools upon the cutter head described are readily adjusted by concealed set screws which nonetheless are accessible to a sufficiently long wrench 29 by which the cutters may be adjusted, it also being evident that the cutters may be adjusted either inwardly or outwardly, that is, to project greater or less extents from the periphery 17 of the main cutter disc 9, with the possibility of quite accurate adjustment being available.

Manifestly, variations may be resorted to and parts and features may be modified or used without others within the scope of the appended claim.

Having now fully described my invention, I claim:

A moulding cutter head comprising a cylindrical solid body, a clamping disc superimposed upon said body and secured thereto, there being a center hole extending through said disc and said body for receiving a saw arbor, said body being provided with a plurality of chordal open ended slots spaced from each other, each of said slots extending inwardly from the face of said body adjacent said disc and terminating at a point adjacent to and spaced from the other face thereof, a cutter including a cutting edge on one end thereof positioned within each of said slots with the cutting edge projecting from one of the open ends of the slot, a cut out formed in each of the cutters adjacent the other end, and a set screw coaxial with the cutter and rotatably positioned within the cut out of each of said cutters and in threaded engagement with an internally threaded portion formed on said body inwardly of the other end of each of said slots.

GEORGE R. JORSCH.

REFERENCES CITED

The following references are of record in the file of this patent:

UNITED STATES PATENTS

| Number | Name | Date |
|---|---|---|
| 406,582 | Harrigan | July 9, 1889 |
| 498,144 | Vose | May 23, 1893 |
| 920,549 | Dette | May 4, 1909 |
| 1,830,813 | Tautz | Nov. 10, 1931 |
| 1,908,628 | Redinger | May 9, 1933 |
| 2,149,618 | Misuraca | Mar. 7, 1939 |

FOREIGN PATENTS

| Number | Country | Date |
|---|---|---|
| 72,826 | Sweden | Dec. 18, 1929 |